United States Patent [19]
Gonzalez

[11] Patent Number: 5,711,877
[45] Date of Patent: Jan. 27, 1998

[54] ETCHED DISC WITH CROSSHATCH PATTERN

[75] Inventor: Antonio E. Gonzalez, South El Monte, Calif.

[73] Assignee: Vacco Industries, South El Monte, Calif.

[21] Appl. No.: 746,502

[22] Filed: Nov. 12, 1996

[51] Int. Cl.[6] .................................................. B01D 29/46
[52] U.S. Cl. ........................... 210/488; 210/489; 210/498; 55/278
[58] Field of Search .................................. 210/488, 489, 210/490, 498; 156/902, 905; 55/278

[56] References Cited

U.S. PATENT DOCUMENTS

| | | | |
|---|---|---|---|
| 3,111,963 | 11/1963 | Brockwell | 210/488 |
| 3,700,111 | 10/1972 | Bode | 210/488 |
| 4,267,045 | 5/1981 | Hoof | 210/488 |
| 4,410,430 | 10/1983 | Hagler . | |
| 4,664,814 | 5/1987 | Backman et al. | 210/488 |
| 4,681,681 | 7/1987 | Drori | 210/498 |
| 4,726,900 | 2/1988 | Keskinen . | |
| 4,774,000 | 9/1988 | Kawai et al. | 210/486 |
| 5,015,381 | 5/1991 | Ellion et al. | 210/490 |
| 5,296,134 | 3/1994 | Zaiter | 210/489 |
| 5,580,454 | 12/1996 | Zaiter | 55/278 |

*Primary Examiner*—W. L. Walker
*Attorney, Agent, or Firm*—Cushman, Darby & Cushman Intellectual Property Group of Pillsbury Madison & Sutro, LLP

[57] ABSTRACT

A thin metal foil disc etched on both sides in such a way as to form a crossover pattern of rectangular flow passages (or channels) spiraling out, in opposite directions, from the inner diameter to the outer diameter of the disc. In the preferred embodiment, these channels have a depth slightly greater than half of the disc thickness, creating an opening through the thickness of the disc at their points of intersection. This disc design, when stacked appropriately into a filter element, provides substantially lower flow losses than other existing designs. When used as a filter, it performs as an absolute surface filter featuring a tortuous flow path and high degree of porosity. When used as a surface tension device, it offers superior wetting and re-wetting characteristics.

20 Claims, 5 Drawing Sheets

ETCHED DISC WITH CROSSHATCH PATTERN

BACKGROUND OF THE INVENTION

1. Field of the Invention

The present invention relates to etched disc stacks and more particularly to a disc filter with crosshatch pattern.

2. Description of the Related Art

Etched disc stacks (EDS) have long been used as fluid filters in the aerospace, nuclear, petrochemical and other industries because they offer a number of advantages over other filtering media such as wire mesh, sintered materials, etc. However, they also have some limitations.

Figure 1:
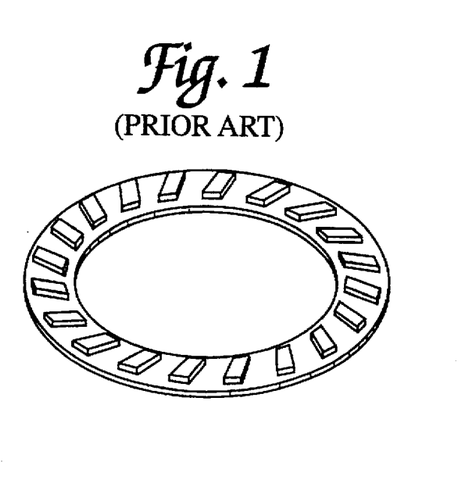
FIG. 1 is a perspective view of a conventional etched disc.

The typical etched disc consists of a thin circular metal foil with chemically etched paths on one side, projecting in a radial direction from the internal diameter to the external diameter of the disc. (FIG. 1). Often, the discs have passages etched on both sides in order to increase porosity through the media.

The disc stacks are constructed by placing etched discs on top of each other in a cylindrical column until the required height is obtained. The discs are oriented in order to insure proper column loading. Next the stack is compressed to a predetermined value to insure that all discs are properly loaded flat, thus guaranteeing the micron rating of the assembly. The assembly is then tack-welded to maintain this condition throughout its service life. Finally, a short series of verification tests is conducted consisting of bubble point, boil point and flow $\Delta P$ tests.

Figure 2:
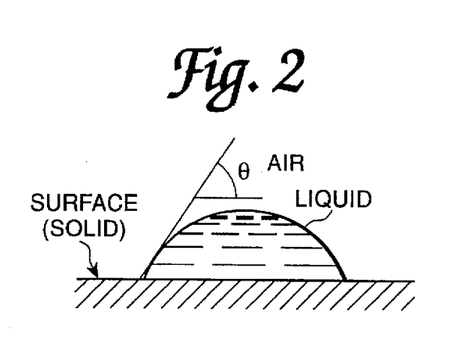
FIG. 2 is a schematic illustration of the surface tension phenomena.

The EDS provides for the separation of liquid and gas by the surface tension phenomena. (FIG. 2). This phenomena can be simply illustrated by the magnitude of the pressure that is required to force a gas bubble through a small, fully wetted orifice, or capillary, and is commonly known as the bubble point. The bubble point is a function of the fluid properties and the geometry of the orifice and is generally expressed as:

$$\Delta P_b = 2\sigma \cos \Theta \; (1/R_1 + 1/R_2)$$

Where, $\Delta P_b$=Bubble point pressure
$\sigma$=Surface tension of fluid
$\Theta$=Contact angle of the fluid/surface interface
$R_{1,2}$=Major, minor radii of a general elliptically-shaped orifice For a channel of rectangular cross-section, with completely wetted surfaces, where $\cos \Theta \approx 1$, the expression can be simplified as follows:

$$\Delta P_b = 2\pi(1/W + 1/b)$$

Where, w,b are the width and depth of the channel, respectively.

When $w \gg b$, the expression reduces to:

$$\Delta P_b = 2\sigma/b$$

Figure 3:
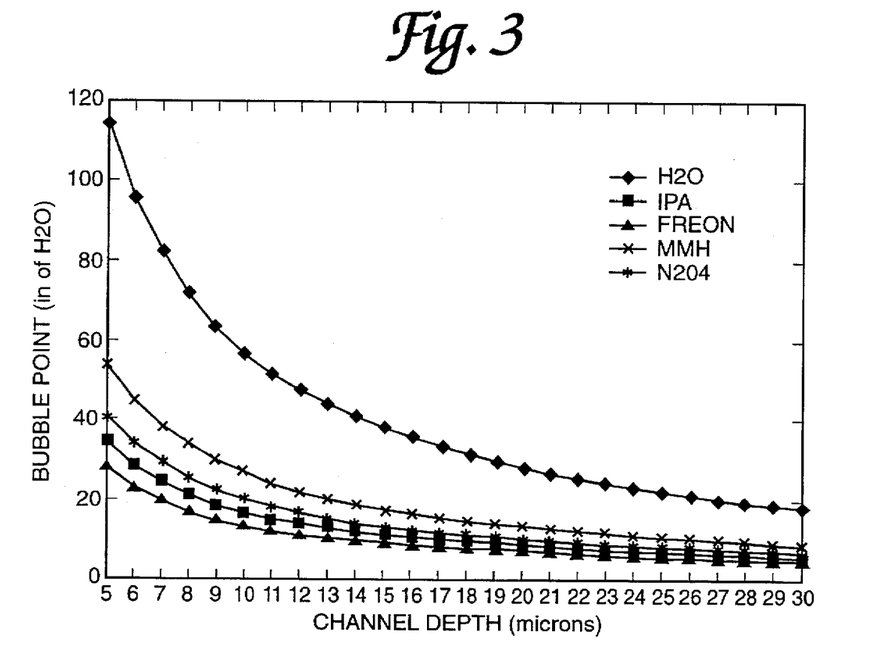
FIG. 3 is a chart showing bubble point versus channel depth for several fluids.

This expression denotes the relationship between the channel depth and the bubble point and provides the basis for a simple performance test. In an EDS submerged in liquid and fully wetted, a slow increase of internal gas pressure will cause the first bubble to appear from the largest pore. In other words, the absolute micron rating of a filter may be easily inferred from a simple bubble point test. A chart showing bubble point vs. channel depth for several fluids is provided in FIG. 3.

From the foregoing discussion, it is evident that the bubble point yields a relative measure of the largest pore in the porous media and thus indicates the absolute filtration rating. However, for any porous media, including etched discs, there exits a density function, or distribution of pore sizes. Depending on the accuracy of the manufacturing process and other variables the shape of the distribution curve will vary as depicted in FIGS. 4A and 4B.

Figure 4A:
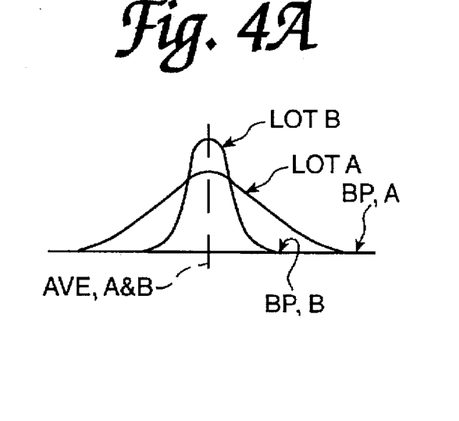
FIG. 4A is a distribution of pore sizes in an etched disc for two filters with the same average pore size exhibiting two different bubble point indications.
Figure 4B:
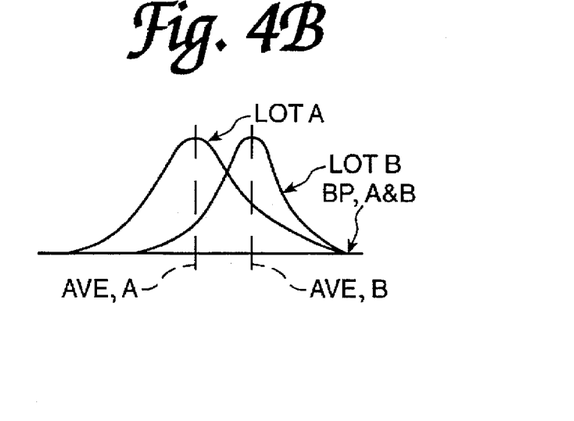
FIG. 4B shows a distribution of pore sizes in an etched disc stack where two filters with the same bubble point indication exhibit widely different average pore sizes.

From a cursory review of FIGS. 4A and 4B, it is evident that two filters with the same average pore size may exhibit two different bubble point indications. Conversely, two filters with the same bubble point indication may exhibit widely different average pore size. This makes difficult the prediction of flow-$\Delta P$ characteristics based on bubble point measurements only.

For this and other reasons, a second test is conducted to determine the uniformity of pore size distribution across the entire porous surface. This test, commonly known as the "boil point" is conducted in the same fashion as the Bubble Point Test. However, in this case, the objective is to measure the capillary pressure required to produce a steady stream of bubbles across most of the porous surface. Therefore, it is an indicator of the average pore size in the media, and of pore size uniformity.

ideally, the bubble and boil points will be very close to each other, indicating a high degree of channel depth uniformity. However, due to variances in the manufacturing processes, a range of channel depths will be obtained.

Using the information from the bubble and boil point indications, an average, or nominal, micron rating may be estimated. This information is useful to help predict flow-$\Delta P$ characteristics with some degree of accuracy, though it is always advisable to verify the analysis by test.

Flow-$\Delta P$ Characteristics

In the rectangular flow channel previously described, where $w \gg b$, the governing flow equation can be approximated by that of capillary flow between two flat plates. (This assumes that the Re number is low and the flow is fully laminar and ignores entrance and exit losses. These assumptions are not adequate for all cases; therefore, the theoretical calculations are used for sizing purposes only and are always to be verified by test).

$$\Delta P_f = 12 \; m_c' \mu L / \sigma b^3 w$$

where: $\Delta P_f$=Frictional pressure drop <PSID>
$m_c'$=mass flow rate through channel
$\mu$=viscosity of fluid
$\rho$=density of fluid
L=length of the channel
b=depth of the channel
w=width of the channel extending the results to an entire etched disc stack, the equation reduces to:

$$\Delta P_f = 12 \; m_s' \mu L / \rho b^3 w N_s N_d$$

Where: $m_s' = m_c' N_s N_d$, total mass flow through stack
NsNd=#channel/disc, #discs/stack
b=avg. depth of all pores (est. from bubble and boil point data)

Note, because The mass flow rate is a cubic function of the slot depth. Therefore, errors in determining b greatly affect the theoretical predictions of flow vs. $\Delta P$. It is, therefore, always advisable to determine these values by test.

As discussed earlier, EDS filters are used for a variety of applications because they offer a number of significant advantages over other filtering media. The most significant advantages are briefly outlined below:

True Surface Filtration

Filtration may be classified as either surface or depth, depending where the particle retention takes place.

Depth filtration is the retention of contaminant particles throughout the thickness of the media, such as in a sand filter, cellulose paper element, or sintered metal element. Consequently, it is possible that given enough time, some of the contaminants migrate all the way through the media.

Conversely, surface filtration is accomplished by the impingement and retention of particles on a single surface plane, namely, the outer surface of the filter element. Filters which block contaminants on only one surface, such as the etched disc filter, tend to inhibit the release of trapped contaminants and lend themselves to cleaning by backflushing to a fully clean condition. This unique feature of the etched disc filter greatly reduces the need for replacement of filter elements, and has resulted in its wide use in automatic backflushable systems for the filtration of nuclear plant fluids and the refining of petrochemical catalyst fluids.

Structural Strength

The etched disc filter's inherent design strength and rigidity are superior to other filter types. When the etched discs are stacked on a mandrel and compressed to a predetermined load, the disc stack forms a monolithic structure capable of sustaining extreme differential pressure loads. It also exhibits superior rigidity for sustaining high dynamic environment loads. The EDS filter has been successfully tested many times to full system differential pressures of up to 6,000 PSID across the element and to extreme dynamic loads, including shock pulses generating over 5,000 g's acceleration.

Other filters, such as those of wire mesh construction, are capable of only limited differential pressure across the element due to collapse of the pleats and eventually the mesh. Similarly, sintered metal filters are susceptible to cracking when exposed to a shock or other high dynamic loading conditions.

Superior Initial Cleanliness

The EDS filter features the unique capability to be completely cleaned prior to assembly and maintained clean during the assembly process. The filter media itself does not require welding, brazing, or other processes that may introduce contamination. This results in an initial cleanliness that is unmatched by other types of filter media.

Each individual disc is cleaned prior to stacking on the mandrel and is assembled in a controlled environment resulting in an assembly free of manufacturing contaminants that may shake loose during vibration or shock, as often occurs with other filter media.

The EDS assembly process consists of stacking the discs on a mandrel, installing the compression plate, and compressing the discs using threaded fasteners or a hydraulic ram. No welding is performed on the filtration media. The only welding performed involves the retaining nut to the mandrel, which is isolated from the filtration media. This welding operation is performed after the discs have been appropriately stacked and loaded to prevent any possible ingestion of contaminants between the discs.

By contrast, the initial weaving and pleating of wire mesh followed by brazing or welding on the filter elements often introduce contaminants into the filter media that are virtually impossible to remove.

Sintered elements by the nature of their manufacturing process, which consists of heating millions of powdered metal spheres to their sinter temperature to adhere to each other, may result in an element with trapped contaminants. The sources of these contaminants may include: foreign particles in the powdered metal, contaminated dies, airborne particles introduced during the process, and incomplete adhesion of the metal spheres to each other during the sintering process.

No Media Migration

Media migration is contamination in the flow downstream of the filter due to breakdown of the filter media itself caused by vibration, shock, or high differential pressure. Media migration is never a concern with the etched disc filter due to its inherent strong and solid structural characteristics. It is, however, a common concern with depth media such as sand or multiple layers of fine fibers.

Material Availability and Compatibility

The etching process allows for the use of a wide range of metallic and even some nonmetallic materials. Among the metals that may be etched into discs for filters are most Corrosion Resistant Steels (CRES): Titanium, Monel, Inconel, Aluminum, Copper, and many other materials including some non-metals. This enables the selection of the most compatible material for the intended application. For instance, Titanium is commonly used for satellite liquid propulsion systems due to its long term compatibility with oxidizers; Nickel based alloys for corrosive salt-water applications; whereas other light-weight materials may be utilized for weight critical applications.

These advantages are significant, and indicate the use of EDS technology for a variety of applications. However, there are also some limitations to the EDS that makes it impractical for some applications. For the most part, these limitations are related to the inability to create pleats to increase the filter surface area for a given envelope.

Current Limitations of EDS Filters

Since EDS filters cannot be pleated to increase surface area, as it can be done with other media, they may exhibit some of the following limitations in performance:

Lower Flux

For the larger EDS elements, the disc configuration can be modified to a "daisy" or "cloverleaf" pattern to increase the surface area with some degree of success. However, small EDS elements are limited to a simple cylinder form, like that for a sintered element. This simple cylinder design, driven primarily by manufacturing constraints, results in lower fluid flux than a comparably sized pleated media element.

Lower Contaminant Tolerance

EDS filters are surface filters, and contamination capacity is a strong function of the total filter surface area and initial porosity. Therefore, contamination tolerance is usually lower than for comparable pleated wire mesh elements.

Greater Weight and Envelope

In order to meet system requirements for pressure drop and contamination tolerance, EDS filters may result in designs that are larger and hence heavier than an equivalent pleated type element.

Fiber Ingestion/Low Tortuosity

All surface-type filters are, in theory, susceptible to permitting the passage of a long, thin fiber having the length dimension greater than the absolute filtration rating of that media. The etched disc filter is no exception.

Although this potential scenario is unlikely, since it would require that the fiber align and thread itself through a pore, it has been theorized and discussed. However, little work has been published comparing the susceptibility of different filter media to fibers.

Other designs claim to minimize this concern by enhancing the entrapment of fibers in the media's tortuous flow paths. Conventional EDS designs cannot make this claim.

Micron Rating

There is also a perception that EDS filters have a limitation with respect to the filter micron rating. This is due to the fact that the cross-sectional area of the flow channel is typically rectangular, and the absolute micron rating is generally related to the etched depth of the channel, and not to the width. Therefore, the EDS, lacking the benefit of a tortuous path to entrap odd shaped particles, could theoretically permit their passage. Since the majority of contaminant particles are not disc shaped, this does not present a significant problem in practice, but the theoretical concerns remain.

Cost

The fabrication method of the EDS filters, including chemically etching flow passages into metal sheet discs, stacking the discs, and compressing and retaining the element, typically results in somewhat higher manufacturing costs than other types of filters.

SUMMARY OF THE INVENTION

From the foregoing discussion, it is evident that a new etched disc design that improves the flow resistance and, if possible, the tortuosity, would be highly desirable. Such a disc would improve the size, weight, and cost of the EDS elements. This is true for both filter and Propellant Management Device (PMD) applications as outlined below.

Etched Disc Filter Application

In filter applications, any decrease in pressure drop characteristics would benefit the EDS in several ways: First, it would reduce the number of etched discs necessary to meet flow capacity requirements. This, in turn, reduces the envelope and weight of the EDS. Consequently, the material and labor costs needed to fabricate, clear, and stack the discs is also reduced. Indeed, the more one improves the pressure drop characteristics of the disc, the greater the improvement in envelope, cost and weight. The only limitation to improvements of this type are related to dirt capacity, which is a function of filter media surface area.

In general, tortuosity has a negative effect on flow capacity, but it is perceived as an important contributor to retaining elongated particles and fibers in the filter media. Therefore, the ideal EDS filter would have increased tortuosity without sacrificing pressure drop.

Propellant Management Devices (PMD) Application

PMD's are used to separate pressurant gas from liquid propellant in space vehicles tanks operating in micro-gravity environments. This is accomplished by using the EDS as a surface tension device. Here, it is most important to minimize pressure drop across the EDS to a level well below its required bubble point, and to offer a redundancy of pores in series to provide a margin against gas ingestion. It is also important that the EDS "wicks" fluid in order to keep it entirely wet (thus sealed), even when it is only partially submerged. Wicking would also help re-wet the stack after it has become dry. In addition, it would be desirable that the PMD EDS internally accumulate enough fluid in reserve, so that it can re-seal itself without the need to re-submerge the stack.

A number of other applications have been suggested for the EDS, including passive cooling devices, heat pipes, etc. In general, a new etched disc design that overcomes the limitations of existing designs is needed.

The pursuit of a high performance disc design, has yielded a new high performance disc design that has been named the Cross Channel Disc (CCD).

The CCD is a thin metal foil disc chemically etched on both sides in such a way as to form a crossover pattern of rectangular flow passages (or channels) spiraling out, in opposite directions, from the inner diameter to the outer diameter of the disc. In the preferred embodiment, these channels have a depth slightly greater than half of the disc thickness, creating an opening through the thickness of the disc at their points of intersection. In other words, all that is left after etching away the flow passages, is the bars separating them.

Other objects, features, and characteristics of the present invention will become apparent upon consideration of the following description and the appended claims with reference to the accompanying drawings, all of which form a part of the specification, and wherein like reference numerals designate corresponding parts in the various figures.

DETAILED DESCRIPTION OF THE PRESENTLY PREFERRED EXEMPLARY EMBODIMENT

Figure 5:
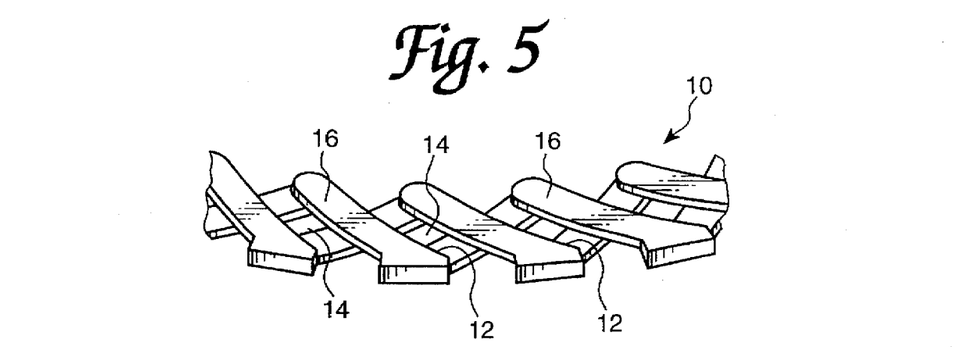
FIG. 5 is an enlarged, broken away schematic view of a cross channel disc provided in accordance with the present invention.

A cross channel or cross-hatched disc 10 formed in accordance with the present invention is a thin metal foil disc that has been chemically etched on both sides so as to form a cross-over or cross-hatched pattern of generally rectangular flow passages or channels 12 which spiral out in respectively opposite directions on each surface of the disc. The channels 12 have a depth slightly greater than half of the disc thickness thereby creating an opening 14 through the thickness of the disc at the point of intersection of the channels 12 on each side of the disc 10. The resulting structure, as schematically shown in FIG. 5 is a lattice or cross-hatched pattern comprising the bars or lands 16 which separate the flow passages 12.

Figure 6:
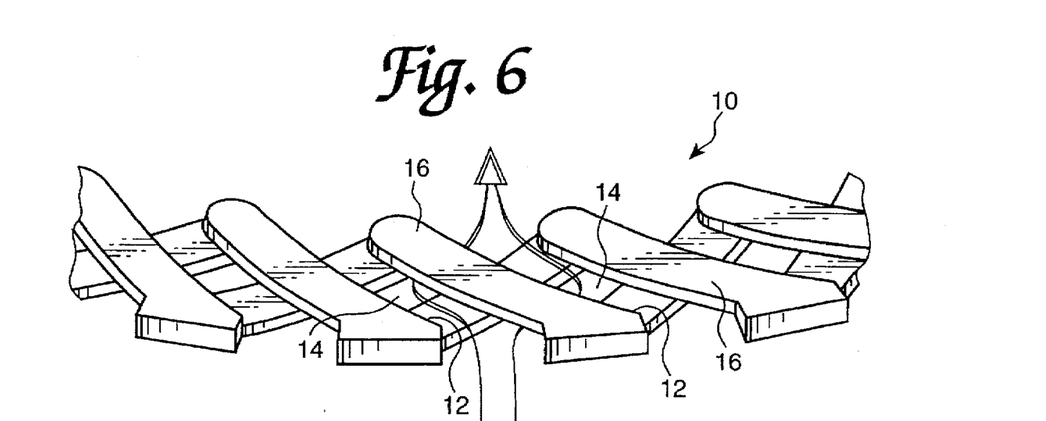
FIG. 6 is an enlarged, broken away schematic view showing a flow pattern through a cross channel disc stack provided in accordance with the invention.

The unique cross-hatch pattern design of the disc 10 induces the fluid to weave through the pores in an interesting and very efficient flow pattern. More particularly, as illustrated in FIG. 6, flow from two adjacent pores or openings 14 converge at the point where the channels 12 intersect, then the flow streamlines are diverted away from each other and into the next set of pores. The process repeats itself until the fluid exits into the inner diameter (ID) of the stack.

The fluid flow pattern effected by the cross-hatch structure of the invention provides a desirable tortuous path across the media to help entrap fibers. Moreover, since the flow converging into and diverging out of the common areas does so in a very symmetrical way, it remains highly laminar. Therefore, flow losses due to turbulence are minimized. Also, because the flow of adjacent levels of fluid approach and exit the common areas at the same relative velocity, virtually no frictional loss will occur in these areas.

Figure 7:
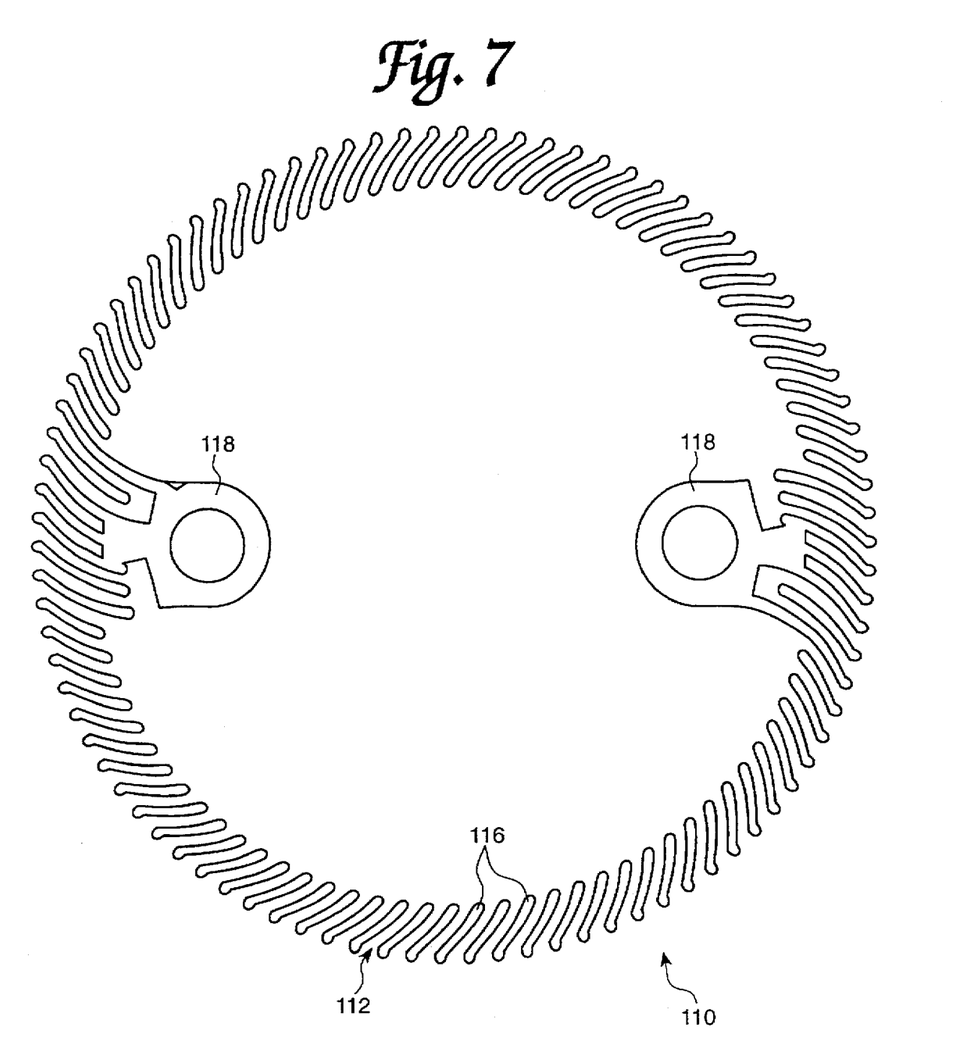
FIG. 7 is an enlarged surface view of an etched disc provided in accordance with the present invention.

One surface of an exemplary etched disc 110 is shown in FIG. 7. Passages 112, and bars or lands 116 therebetween, spiral out from the inner diameter to the outer diameter. As noted above, the opposite surface likewise has passages, and bars or lands therebetween, spiraling out in the opposite direction so as so form the cross-hatch pattern was schematically shown in FIGS. 5 and 6, and is discussed in greater detail below with reference to the exemplary disc structure shown in FIG. 8. In the illustrated embodiment, the disc 110 includes compression ears 118 for receiving a pair of pull rods 120 upon assembly of the stack as discussed below with reference to FIG. 9.

Figure 8:
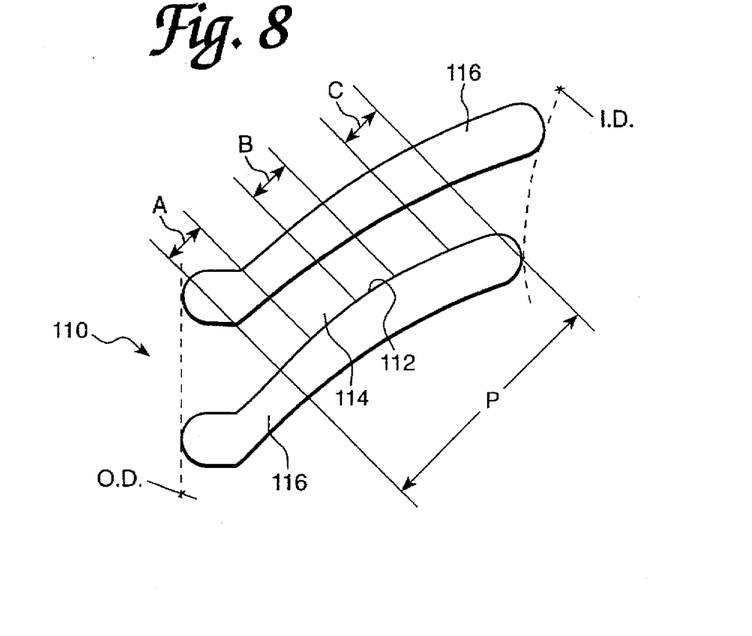
FIG. 8 is an enlarged, broken away plan view showing detail of the etched disc of FIG. 7.

With reference to FIG. 8, detail of an exemplary etched disc 110 in accordance with the invention is shown. In this example, the disc 110 is dimensioned as follows:

| | |
|---|---|
| Inner Diameter (ID) | = 3.129 cm. (1.232 inch) |
| Outer Diameter (OD) | = 3.683 cm. (1.450 inch) |
| Average total path length P | = 0.218 cm. (0.086 inch) |
| Path width at ID* | = 0.056 cm. (0.0220 inch) |
| Path width at OD* | = 0.055 cm. (0.0216 inch) |
| No. of cross-overs per path | = 3 |
| Cross-over lengths: A | = 0.030 cm. (0.012 inch) |
| B | = 0.033 cm. (0.013 inch) |
| C | = 0.038 cm. (0.015 inch) |
| Nominal disc thickness | = 0.003 cm. (0.0012 inch) |
| Discs per 2.54 cm. (1.00 inch) of stack | = approx. 833 |
| Actual typical etch depth | = 20 microns |
| Number of paths per side** | = 90 |

*the passage width is measure as the shortest distance between a selected point on one side of the flow passage (entry or exit) and the other side.
**In the embodiment illustrated in FIG. 7, twelve (12) of these paths go through the compression ears, and have longer effective path lengths.

It is noted that although in the above exemplary embodiment the path width increases slightly along its length, the flow path width effectively remains and is intended to remain fairly constant.

Dimensions and other such characteristics of the disc will vary depending on the particular micron rating and related structural considerations. In general in the example detailed above, it was envisioned to provide for approximately 50% open area, that is the width of the passage equals the width of the bar or land at the inner diameter of the part. Of course the more open area the better for flow performance. However, structural considerations require the heftiest possible bars for handling and compression load bearing. Therefore, the design is ultimately a compromise between these two requirements. The primary concern is to have adequate "land" areas whereby the necessary compression loads will be carried without having a so-called smiling effect on the filter stack. Smiling is the term used to refer to when the discs slide in rotation about the control axis, loosing their correct registration and alignment, when a compression load is applied to the stack. Furthermore, for flow capacity and pressure drop considerations, the passage width is not as critical as the passage depth. In this example, the decision was made to sacrifice some "Open Area" in order to maintain some structural integrity of the single disc. This makes the assembly easier to handle while stacking. Also, the length of the passage and the number of cross-over points is another consideration. Initially, the disc was proposed to have four cross-over points, but ultimately the path was shortened to three cross-overs. This reduced pressure drop significantly. However, structural considerations for the micron rating of the exemplary embodiment prevented any further reductions to length.

Figure 9:
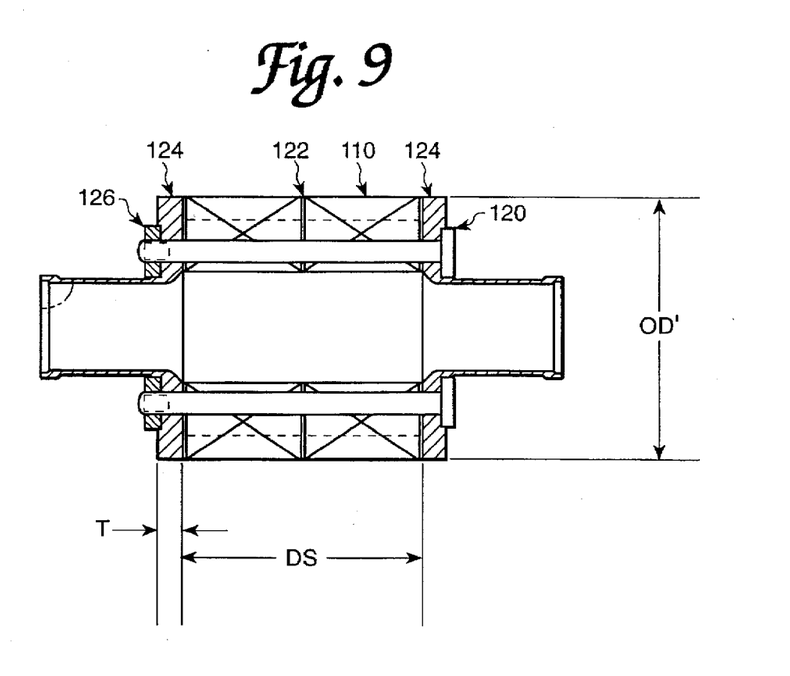
FIG. 9 shows a disc stack constructed by placing discs formed in accordance with the present invention on top of each other in a cylindrical column.

A disc stack is constructed by placing properly aligned discs on top of each other in a cylindrical column until the required height is obtained. Thus, with reference to FIG. 9, the discs 110 are oriented in order to insure proper column loading and to align the openings 114 across each disc into a series of flow passages running axially through the stack. As shown in the embodiment of FIG. 9, one or more spacers 122 of, e.g., titanium may be incorporated in the stack and the stack of discs are sandwiched between suitable end piece tubes 124.

The purpose of the spacers 122 is to provide structural stability to the loaded column. Since each etched disc 110 is not exactly flat and both sides are not exactly parallel, it has been found particularly desirable to include the spacers 122 to maintain and distribute the compression load equally. Depending on the disc thickness and the amount of material removed and the diameter of the discs, the number and spacing of these spacers may vary. In the illustrated embodiment, the distance between spacers was selected so as not to exceed 2.54 cm. (1 inch).

The spacers 122 are discs of the same inner and outer diameter as the filter discs 110. However, in order to maintain rigidity, their surfaces are not etched; they are very flat and possess a good finish. In the presently preferred embodiment, however, in order to ensure wicking along the length of the stack, holes have been etched through the spacers 122 at the same location as the filter discs.

In the illustrated embodiment, the spacers 122 are also utilized at the ends of the stack to prevent any minor imperfection on the end piece tubes 124 from deforming the more pliable filter discs 110.

Next the stack is compressed, e.g. with pull rods 120 inserted through respective compression ears 118 and secured with nuts 126, to a predetermined value to insure that all discs 110 are properly loaded flat, thus guaranteeing the micron rating of the assembly. The assembly is then tack-welded to maintain this condition throughout its service life. By way of example, in the embodiment illustrated in FIG. 9, the outer diameter of the stack (OD') is about 3.734 cm. (1.470 inch), the length of the disc stack (DS) is about 3.416 cm. (1.345±0.025 inch), and the thickness (T) of the bolted end of the end tube is about 0.356 cm. (0.14 inch).

Finally, a short series of verification tests, e.g., Bubble point, Boil point and Flow Capacity, are conducted.

In this configuration, a stack of these especially-designed discs, offers significant advantages over the conventional EDS filter. These advantages can be summarized as follows:

1. The new cross-hatch design maximizes the porosity (number of channels times the flow area of each channel, divided by the filter total surface area), while maintaining a given pore size, resulting in minimum flow resistance for a given bubble point.
2. The flow streamline zigzags through the disc passages as depicted in FIG. 6. This action, provides two very important benefits. First, it provides the desired tortuous path across the media to help entrap fibers, while otherwise retaining all other advantages of a true surface filter. Second, since the flow converging into and diverging out of the common areas does so in a very symmetrical way, it remains highly laminar. Therefore, no additional flow losses are incurred due to turbulence. In addition, since the flow of adjacent levels of fluid also approach and leave the common areas at the same relative velocity, there is virtually no frictional loss in these areas.

Figure 10:
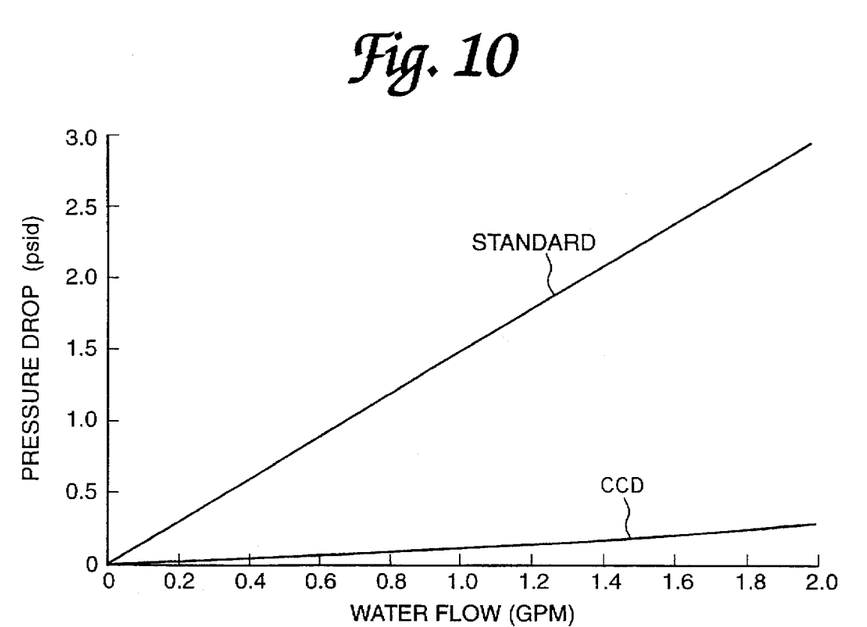
FIG. 10 shows pressure drop (psid) versus water flow (gpm) for the cross channel disc versus a standard filter 1.5 inch disc stack.

The pressure losses are, therefore, confined to the areas where the fluid goes through a pore, where there is friction from the stationary metal walls. Refer to FIG. 10.

3. Lower flow resistance results in a lighter, more compact stack.
4. The crossover or cross-hatch pattern offers an unparalleled level of redundancy against bubble point failures: it provides for three, or more, pores in series for each radial flow channel.
5. As described earlier, the crossover pattern also provides a series of flow passages running axially through the EDS which gives the stack the capability to wick-up fluid. This is especially important for PMD devices, because in the event the stack dries-up or breakdown occurs it allows the stack to re-wet itself and re-acquire fluid. It also provides the stack with significant liquid retention capabilities. Namely, the EDS will retain fluid even when exposed to high acceleration. In the case of breakdown (when gas is allowed through the wetted stack), it will have the tendency to wick-up fluid and re-wet itself, thus re-establishing the gas barrier once the pressure across the stack has equalized.

It should be noted that the physical limitations of the etching process and the structure of the etched disc itself will determine the minimum micron rating. Namely, that in order to etch intersecting passages on both sides of the disc, the depth of the passages (hence, the micron rating) must be greater than or equal to half the thickness of the disc itself. Since it is impracticable to work with foil thickness of less than about 0.001 inch, the minimum micron rating possible is approximately 20 microns.

Nevertheless the new CCD design offers an innovative way of utilizing the EDS technology for a wider range of applications including, but not limited to, fluid filters and PMD devices. It also serves these applications at a lower price and at a superior level of performance.

A high performance etched disc design has thus been provided that offers a number of significant advantages over existing designs. This new disc design, when stacked appropriately into a filter element, provides substantially lower flow losses than other existing designs, while maintaining and enhancing all other desirable performance characteristics. When used as a filter, it performs as an absolute surface filter featuring a tortuous flow path and high degree of porosity. When used as a surface tension device, it offers superior wetting and re-wetting characteristics by wicking fluid along its length and trapping fluid internally in a sponge-like fashion. The design lends itself to several manufacturing materials and methods, although chemical milling of CRES or Titanium are preferred.

While the invention has been described in connection with what is presently considered to be the most practical and preferred embodiment, it is to be understood that the invention is not to be limited to the disclosed embodiment, but, on the contrary, it is intended to cover various modifications and equivalent arrangements included within the spirit and scope of the appended claims. Thus, it is to be understood that variations in the particular parameters used in defining the crosshatched etched disc of the present invention can be made without departing from the novel aspects of this invention as defined in the claims.

What is claimed is:

1. A filter element comprising:
   a sheet of material having an inner peripheral edge and an outer peripheral edge and an opposite pair of parallel surfaces, each of said surfaces having portions removed to define integral lands standing out in relief from opposite sides of a base portion;
   said lands of one of said surfaces comprising a spaced series of first lands that extend from adjacent said inner edge to adjacent said outer edge, each adjacent pair of first lands defining a fluid flow channel therebetween on one side of said base portion;
   said lands of the other of said surfaces comprising a spaced apart series of second lands, each of which extends from adjacent said inner edge to adjacent said outer edge, each adjacent pair of second lands defining a channel therebetween over the other side of said base portion, the first lands of the one side and the second lands of the other side being at least partially superimposed so as to cross over one another and further wherein at least some of said channels include at least one aperture defined through said base portion from the one side to the other.

2. A filter element as in claim 1, wherein the inner and outer peripheral edges of said sheet are each generally circular.

3. A filter element as in claim 2, wherein the lands of at least one of said sides are inclined with respect to a radial direction of said sheet.

4. A filter element at in claim 3, wherein the lands of each said side are inclined with respect to radial and extend in respectively opposite directions so as to provide said superimposition.

5. A filter element as in claim 1, wherein the lands of at least one of said sides extend from said inner edge to said outer edge.

6. A filter element as in claim 1, wherein at least one of an inner end and an outer end of at least some of said lands are generally rounded.

7. A filter element as in claim 1, wherein said portions removed to define integral lands extend through at least about half of a thickness of said filter element thereby to define apertures where channels of the respective sides intersect.

8. A one piece filter element as in claim 1, further comprising at least one pull rod receptacle for receiving a pull rod for assembling a plurality of one piece filter elements in a stacked configuration.

9. A one piece filter element as in claim 1, wherein at least two said apertures are defined along the length of each said channel.

10. A one piece filter element comprising:

a sheet of material having an inner peripheral edge and an outer peripheral edge and an opposite pair of parallel surfaces, each of said surfaces having portions removed to define integral lands standing out in relief from opposite sides of a base portion;

said lands of one of said surfaces comprising a spaced series of first lands that extend from adjacent said inner edge to adjacent said outer edge, each adjacent pair of first lands defining a fluid flow channel therebetween on one side of said base portion;

said lands of the other of said surfaces comprising a spaced apart series of second lands, each of which extends from adjacent said inner edge to adjacent said outer edge, each adjacent pair of second lands defining a channel therebetween over the other side of said base portion, and the lands of each said side being inclined with respect to a radial direction and extending outwardly from the inner edge in respectively opposite directions so that the first lands of the one side and the second lands of the other side are partially superimposed so as to cross over one another and further wherein at least some of said channels include at least one aperture defined through said base portion from the one side to the other.

11. A one piece filter element as in claim 10, wherein said portions removed to define integral lands extend through at least about half of a thickness of said filter element thereby to define apertures where channels of the respective sides intersect.

12. A one piece filter element as in claim 10, further comprising at least one pull rod receptacle for receiving a pull rod for assembling a plurality of one piece filter elements in a stacked configuration.

13. A one piece filter element as in claim 10, wherein at least two said apertures are defined along the length of each said channel.

14. A stacked-disc structure for a filter assembly comprising:

a plurality of filter elements, each said filter element comprising:

a sheet of material having an inner peripheral edge and an outer peripheral edge and an opposite pair of parallel surfaces, each of said surfaces having portions removed to define integral lands standing out in relief from opposite sides of a base portion;

said lands of one of said surfaces comprising a spaced series of first lands that extend from adjacent said inner edge to adjacent said outer edge, each adjacent pair of first lands defining a fluid flow channel therebetween on one side of said base portion;

said lands of the other of said surfaces comprising a spaced apart series of second lands, each of which extends from adjacent said inner edge to adjacent said outer edge, each adjacent pair of second lands defining a channel therebetween over the other side of said base portion, the first lands of the one side and the second lands of the other side being at least partially superimposed so as to cross over one another and further wherein at least some of said channels include at least one aperture defined through said base portion from the one side to the other;

said filter elements being stacked to define a disc stack;

first and second end piece tubes disposed at each axial end of said disc stack; and at least one pull rod extending between said end piece tubes for compressing said disc stack therebetween.

15. A structure as in claim 14, further comprising at least one spacer disc disposed between each said end piece tube and said disc stack.

16. A structure as in claim 14, further comprising a spacer disc interposed between two discs of said stack, said spacer disc having apertures defined therethrough, at least some of said apertures being disposed so as to correspond to apertures of said discs.

17. A structure as in claim 14, wherein the lands of at least one of said sides are inclined with respect to a radial direction of said sheet.

18. A structure as in claim 17, wherein said portions removed to define integral lands extend through at least about half of a thickness of said filter element thereby to define apertures where channels of the respective sides intersect.

19. A structure as in claim 14, wherein each said disc further comprises at least one pull rod receptacle for receiving said at least one pull rod.

20. A structure as in claim 14, wherein the inner and outer peripheral edges of said sheet are each generally circular.

* * * * *